H. C. SEIPP.
MOLD FOR FORMING SIDEWALKS AND OTHER LIKE CONSTRUCTIONS.
APPLICATION FILED MAR. 18, 1910.

994,540.

Patented June 6, 1911.

2 SHEETS—SHEET 1.

WITNESSES

INVENTOR.
Henry C. Seipp,
By G. N. Cooke
Attorney.

H. C. SEIPP.
MOLD FOR FORMING SIDEWALKS AND OTHER LIKE CONSTRUCTIONS.
APPLICATION FILED MAR. 18, 1910.

994,540.

Patented June 6, 1911.

2 SHEETS—SHEET 2.

WITNESSES

INVENTOR
Henry C. Seipp.
By J. N. Cooke,
Attorney.

UNITED STATES PATENT OFFICE.

HENRY C. SEIPP, OF CORAOPOLIS, PENNSYLVANIA.

MOLD FOR FORMING SIDEWALKS AND OTHER LIKE CONSTRUCTIONS.

994,540.

Specification of Letters Patent. Patented June 6, 1911.

Application filed March 18, 1910. Serial No. 550,213.

*To all whom it may concern:*

Be it known that I, HENRY C. SEIPP, a resident of Coraopolis, in the county of Allegheny and State of Pennsylvania, have invented a new and useful Improvement in Molds for Forming Sidewalks and other Like Constructions; and I do hereby declare the following to be a full, clear, and exact description thereof.

My invention relates to molds for forming sidewalks and other like constructions, and has for its object to provide a cheap, simple and efficient means for forming such constructions, which will enable them to be formed rapidly, cheaply and conveniently, and will allow for the easy and quick placing and removal of the forming parts for such mold, as well as providing for their use at other places.

My invention consists, generally stated, in the novel arrangement, construction and combination of parts, as hereinafter more specifically set forth and described and particularly pointed out in the claims.

To enable others skilled in the art to which my invention appertains to construct and use my improved mold for forming sidewalks and other like constructions, I will describe the same more fully, referring to the accompanying drawings, in which—

Figure 1:
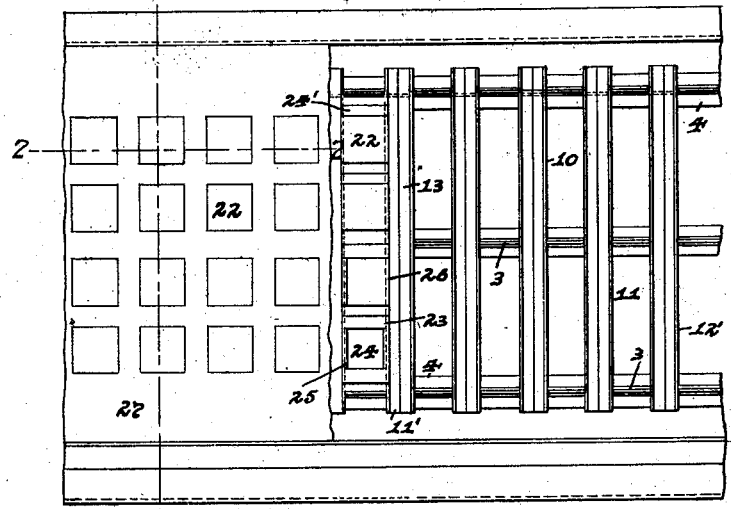
Figure 2:
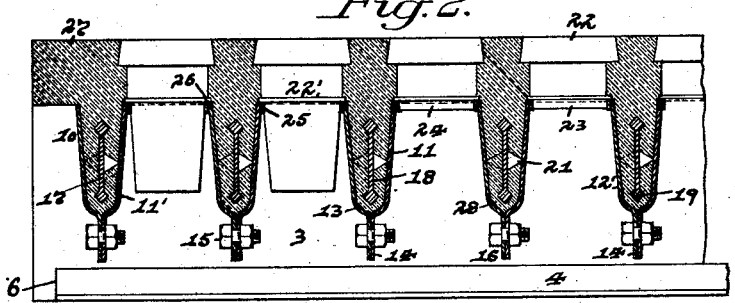
Figure 3:
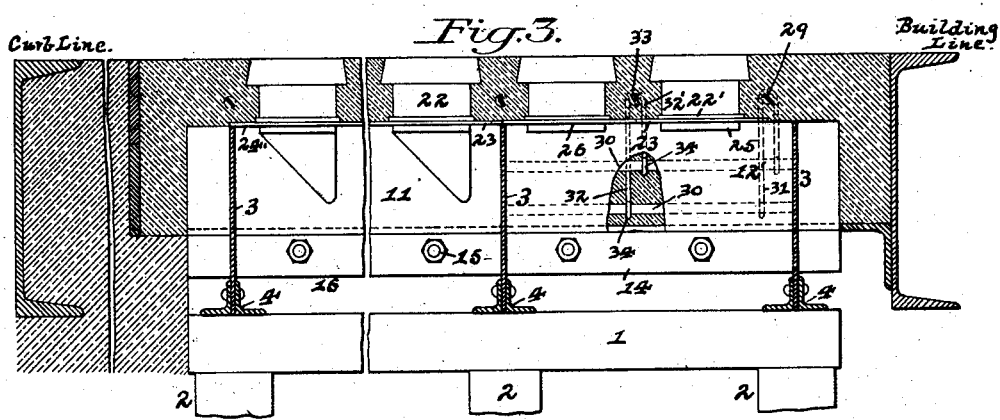
Figure 4:
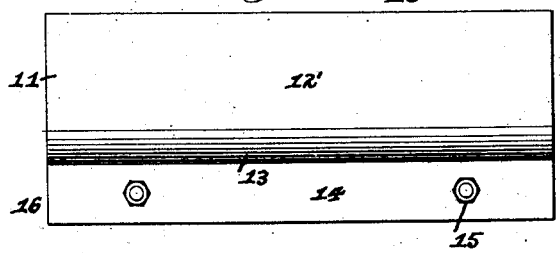
Figure 5:
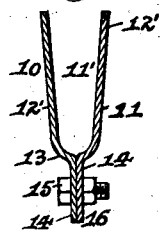
Figure 6:
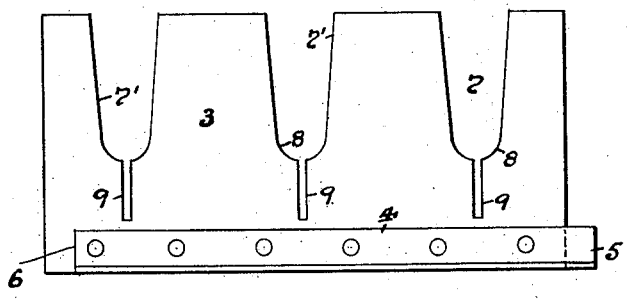
Figure 7:
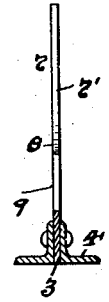
Figure 8:
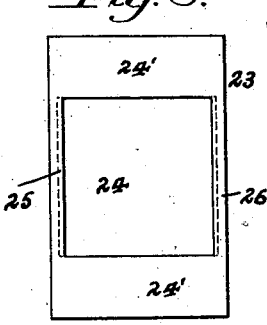
Figure 11:
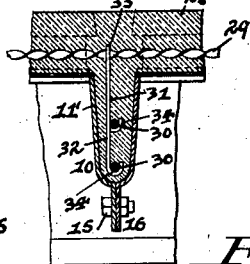
Figure 9:
Figure 10:
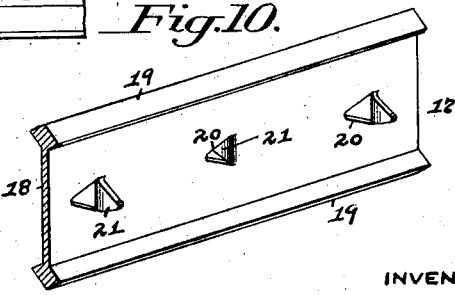

Figure 1 is a plan view of my improved mold for sidewalks and other like constructions showing the same in position for forming a sidewalk and with a portion of such walk partly formed. Fig. 2 is an enlarged cross-section of the same on the line 2—2 Fig. 1 and showing the formation of the sidewalk. Fig. 3 is an enlarged sectional view on the line 3—3 Fig. 1. Fig. 4 is a side view of the mold section. Fig. 5 is a cross-section of the same. Fig. 6 is a side view of the supporting plate for the mold sections. Fig. 7 is a vertical section of the same. Fig. 8 is a plan view of the spacer. Fig. 9 is a cross-section of the same. Fig. 10 is a perspective view of one form of the reinforcing bar employed. Fig. 11 is a detail sectional view showing another form of reinforcing bar and the manner of supporting the same.

Like symbols of reference herein indicate like parts in each of the figures of the drawings.

As illustrated in the drawings, the sidewalk or other like construction is built up by my improved mold, as shown in Figs. 1, 2 and 3, by first placing the temporary ledges 1 on the ordinary supporting standards or trestles 2, and such ledges are so arranged that they will conform strictly to the profile of the sidewalk or street. These ledges 1 support the mold supporting plates 3, which are preferably formed of wrought metal sections such as steel, and are of the construction shown in Figs. 6 and 7, for being arranged in a vertical line and parallel with each other on such ledges. The plates 3 are provided with angle bars 4 of the usual rolled form from metal such as steel, which are riveted on each side of the lower edge of the plates for resting on said ledges, and such bars extend beyond one end of said plates 3, as at 5, while they terminate short of the opposite end of said plates, as at 6, so that when the sections of such plates are placed on the ledges 1 and against each other by their end edges, the end portions 6 on said plates will fit between the end portions 5 on said bars. Extending down from the upper edge of the plates 3 are the tapered slotted portions 7, which have their walls 7' inclined toward each other to join with rounded or curved portions 8 at their lower ends extending toward each other, and projecting centrally from each of said curved portions and downwardly therefrom is the straight slotted and contracted portion 9.

The molds 10 are formed in sections, such as is shown in Figs. 4 and 5, and are preferably made of wrought metal, such as steel, and in two parts which are pressed or drawn to shape to form the body portion 11 having the mold cavity 11' therein of grooved or trough-shaped form and which is formed by the side wall 12' on each of said parts extending parallel to each other horizontally so that the space or distance across the same diminishes toward the bottom of the same and increases toward the top thereof to form a tapered mold cavity. The bottom of the cavity 11' is formed curved or rounded through each of the parts for forming the molds 10 having its rolls 12' provided with a rounded or curved portion 13 at the lower ends of the same and extending toward each other, while each of these curved portions 13 terminate in a flange 14, which extends downwardly, so that such flanges can be connected together by bolts 15 and thereby form tongues 16 for the molds 10.

The sections of the molds 10 are placed upon the plates 3 on the ledges 1, so as to extend across the same, by the inclined walls 12′ on such molds fitting within the slotted portions 7 in such plates and against the inclined walls 7′ on such portions, and the tongues 16 on such sections will fit within the slotted portions 9 in said plates, so that such sections when in position to form the series of parallel molds 10 on said plates will serve as a pattern, a support for the glass or other tile, a support for the reinforcing bars, and as a uniform spacer for such tiles, as hereinafter described. When the sections of the molds 10 are thus placed in position on the plates 3, a reinforcing bar 17 of the form shown in Fig. 10 can be placed in the cavity 11′ of such molds, and such bar is preferably formed of metal, such as steel, and provided with the flat body portion 18 having the enlarged square portions 19 at the side edges of the same. Openings 20 are cut or punched through the body 18 of the bar 17, so as to form wings 21, which are bent out from said openings from the metal cut therefrom, in any suitable manner, and are preferably of angular shape, so that they will extend out at right angles from each side of the bar, and will thereby leave such openings of similar shape. When the bar 17 is placed within the cavity 11′ of the molds 10 it is supported therein by the converging side walls 12′ of such cavity through the outer pointed edge on the wings 21 on such bar coming in contact with said walls, and at a point high enough in said cavity to leave a space of sufficient size between the under side portion 19 of said bar and the bottom of said cavity for the admission of sufficient cement or concrete therein to embed said bar. The molds 10 are now ready for the placing of the lenses or tiles 22, which are set between two parallel sections in forming such molds, and each of said lenses or tiles are placed within an opening 24 in the separators or spacers 23 supported on said parallel sections. These spacers 23 are formed of thin sheet metal such as steel, and the openings 24 within the same are cut, so as to arrange for sufficient metal at the sides of the same, which is bent down to form the flanges 25 and the side ledges 26 at right angles thereto on said spacers. When in position on the parallel sections of the molds 10, the spacers are supported on such sections by the flanges 25 engaging with the side walls 12 of such molds and the ledges 26 fitting over and resting against the top edges of said walls. The lenses or tiles 22 can be supported in the openings 24 of the spacers 23 by the beads or rims 22′ on said lenses or tiles resting on said ledges and on the end portions 24′ on said spacers, while such end portions on the spacers abut against each other and thus position the lenses or tiles in their proper and even positions, so that by the supporting of the spacers by the mold sections and the supporting of the lenses or tiles by the spacers, such lenses or tiles are uniformly spaced or separated on a parallel line as outwardly from the building and on a parallel line at right angles thereto. With the lenses or tiles 22, spacers 23, and molds 10 thus in place, the parts are ready for the completion of the sidewalk by the pouring and spreading of the cement or concrete 27 which fills the cavity 11′ of the molds 10 and openings 20 in the bar 17 and extends around the lenses or tiles 22, as well as over the tops of the said molds and spacers 23. After thus filling all voids and crevices in the parts by the cement or concrete 27 and when it has extended to and above the top surfaces of the lenses or tiles 22, it is troweled and worked down to a level or finished surface and even with such top surfaces of said lenses or tiles. When the structure so formed is dry and of sufficient age and strength to be self-sustaining, the temporary ledges 1 and supports 2 for same, together with the mold plate 3, molds 10 and spacers 23 are removed from such structure, and such parts are thus ready and again available for use in similar constructions. The structure so formed can be provided with various forms of reinforcing bars and at different places therein, such as the bars 29, shown in Fig. 3, which can be of the ordinary twisted or spiral form and can be laid in the cement or concrete 27 when such cement or concrete is placed in the structure, and at right angles to the longitudinal direction of the mold cavity 11′. These bars 29 can also support ordinary reinforcing bars 30 extending longitudinally within the mold cavities 11′ and hung therein from said bars 29 by means of hooked shaped members 31, as shown in Figs. 3 and 11, which members are formed of heavy wire and are bent so as to form two legs 32 and 32′ thereon with the curved end connection 33 between the same for fitting over and around the supporting bars 29. The leg 32 is longer than the leg 32′ and each end of the same is provided with the hook portions 34 thereon for fitting under and supporting the bars 30 at different heights in line with each other, and the molding devices can be used to form constructions, other than sidewalks, while various other modifications and changes in the parts composing my improved mold and the structure formed thereby, may be resorted to, without departing from the spirit of the invention or sacrificing any of its advantages.

It will be obvious that the converging mold walls 12 of the molds 10 will serve as a wedging support for the reinforcing bar 17 and as a mold to form a cement or concrete rib 28 having a rounded lower end in the area spanning structure so formed, which diminishes in thickness toward the bottom and thus increasing the distance from each of such ribs to its adjacent or next rib of similar construction and form, while at the same time obtaining a greater line of incidence for the transmission of light rays through the lenses or tiles 22, and thereby resulting in a greater divergence or diffusion of light upon the area below the structure so formed.

It will thus be seen that the structure formed by my improved mold will be more rigid and unyielding than the ordinary approved structure of this class and will overcome the scuffing of the lenses or tiles so common in the heretofore pliant and springy structures, while the structure formed by such mold is also resisting to any change of form when acted upon by force within the limits of any reasonable span. In some structures not intended to support any great amount of live load, as in roofs, the mold construction may be modified to such an extent as will enable the ribs of the structure to be placed at a greater distance apart, and a single spacer used between two of the molds which is perforated for the insertion of the lenses or tiles, while in other cases in which other structures are formed it may be desirable to use tiles for ventilation instead of the glass lenses or tiles, as it may be desirable to omit the use of lenses or tiles from a portion of the structure or entirely therefrom and thereby form a monolithic structure of cement, sand and metal. It will also be seen that by my improved mold it will enable the work of building structures to be performed in such a manner as to permit the use of a supporting means to act as a former or mold for such work, and such means can be used continuously in this work and for different kinds of structures.

The mold can be applied in forming various structures other than those described and will permit the employment of different forms of glasses, lenses or tiles, or supporting or reinforcing bars, while the structures so formed by such mold will be strong and durable, will be light in weight and material and will present to the eye a neat and finished piece of work. The mold being made in two parts can be opened and be spread apart when its supporting means is removed, to free the mold from the structure, by slightly unscrewing the bolts connecting said parts together, and thereby overcome any breaking or injury to the structure through the "sticking" or any undue adherence or binding of said mold to the structure.

What I claim as my invention and desire to secure by Letters Patent is—

1. In a mold for forming sidewalks and other like constructions, the combination with removable supporting means, of a vertical slotted mold supporting plate on said means, and a removable mold section of trough-shaped form on said plate.

2. In a mold for forming sidewalks and other like constructions, the combination with a removable supporting means, of a vertical slotted mold supporting plate on said means, and a removable mold section of trough-shaped form on and extending across said plate.

3. In a mold for forming sidewalks and other like constructions, the combination with a removable supporting means, of a vertical slotted mold supporting plate on said means, and a removable mold section of trough-shaped form fitting within and extending across said plate.

4. In a mold for forming sidewalks and other like constructions, the combination with a removable supporting means, of a vertical mold supporting plate on said means having a slotted portion therein, and a removable mold section of trough-shaped form fitting within said slotted portion and extending across said plate.

5. In a mold for forming sidewalks and other like constructions, the combination with a removable supporting means, of a vertical mold supporting plate having a slotted portion therein provided with a contracted portion, and a removable mold section of trough-shaped form fitting in said slotted portion and extending across said plate, said section being provided with a flanged portion thereon for fitting in said contracted portion.

6. In a mold for forming sidewalks and other like constructions, the combination with removable supporting means, of a vertical slotted mold supporting plate on said means, and a removable mold section of trough-shaped form on said plate and formed of two mold parts.

7. In a mold for forming sidewalks and other like constructions, the combination with a removable supporting means, of a vertical slotted mold supporting plate on said means, and a removable mold section of trough-shaped form on and extending across said plate, said section being formed of two mold parts.

8. In a mold for forming sidewalks and other like constructions, the combination with a removable supporting means, of a vertical slotted mold supporting plate on said means, and a removable mold section of trough-shaped form fitting within and extending across said plate, said section being formed of two mold parts.

9. In a mold for forming sidewalks and other like constructions, the combination with a removable supporting means, of a vertical mold supporting plate on said means having a slotted portion therein, and a removable mold section of trough-shaped form fitting within said slotted portion and extending across said plate, said section being formed of two mold parts.

10. In a mold for forming sidewalks and other like constructions, the combination with a removable supporting means, of a vertical mold supporting plate having a slotted portion therein provided with a contracted portion, and a removable mold section of trough-shaped form fitting in said slotted portion and extending across said plate, said section being formed of two mold parts and each provided with a flange for fitting in said contracted portion.

11. In a mold for forming sidewalks and other like constructions, the combination with removable supporting means, of a vertical mold supporting plate having a slotted portion therein provided with a contracted portion, and a removable mold section of trough-shaped form fitting in said slotted portion and extending across said plate, said section being formed of two mold parts and each provided with a flange for being connected together and for fitting in said contracted portion.

12. In a mold for forming sidewalks and other like construction, the combination with removable supporting means, of a vertical slotted mold supporting plate on said means, a series of parallel and removable mold sections of trough-shaped form on said plate, and removable means between and supported by said sections for supporting lenses or tiles placed within the same and for spacing the same.

13. In a mold for forming sidewalks and other like constructions, the combination with removable supporting means, of a vertical slotted mold supporting plate on said means, a series of parallel and removable mold sections of trough-shaped form on said plate, and removable metallic plates between and supported by said sections for supporting lenses or tiles placed within the same and for spacing the same.

14. In a mold for forming sidewalks and other like constructions, the combination with removable supporting means, of a vertical slotted mold supporting plate on said means, a series of parallel and removable mold sections of trough-shaped form on said plate, and removable metallic plates between and supported by said sections for supporting lenses or tiles by openings therein and for spacing the same.

15. In a mold for forming sidewalks and other like constructions, the combination with removable supporting means, of a removable mold supporting plate on said means, a series of parallel and removable mold sections of trough-shaped form on said plate, and removable metallic plates between and supported by said sections for supporting lenses or tiles by openings therein and for spacing the same, said plates having downwardly extending flanges for fitting against the sides of said sections and for forming ledges to engage with the tops of said sections to support the same.

16. The combination with a trough-shaped mold for forming sidewalks and other like constructions, of reinforcing bars within said mold, a reinforcing bar above said mold, and a means connected to and between the first named bars and the last named bar to support and hang said last named bars at different heights in said mold.

17. The combination with a trough-shaped mold for forming sidewalks and other like constructions, of reinforcing bars within said mold, a reinforcing bar above said mold, and a hooked member on said last named bar having a long leg and short leg thereon for being connected to said first named bars to support and hang the same at different heights in said mold.

18. The combination with a trough-shaped mold for forming sidewalks and other like constructions, of reinforcing bars within said mold, a reinforcing bar above said mold, and a hooked member on said last named bar having a long leg and a short leg thereon provided with hook portions for being connected to said first named bars to support and hang the same at different heights in said mold.

In testimony whereof, I, the said HENRY C. SEIPP, have hereunto set my hand.

HENRY C. SEIPP.

Witnesses:
   JAMES L. WEHN,
   J. N. COOKE.

---

Copies of this patent may be obtained for five cents each, by addressing the "Commissioner of Patents, Washington, D. C."